Feb. 23, 1954 R. K. BAISCH Re. 23,786
ARMOR SHIELD FOR PROJECTILE TYPE FASTENINGS
Original Filed Oct. 23, 1951 3 Sheets-Sheet 1
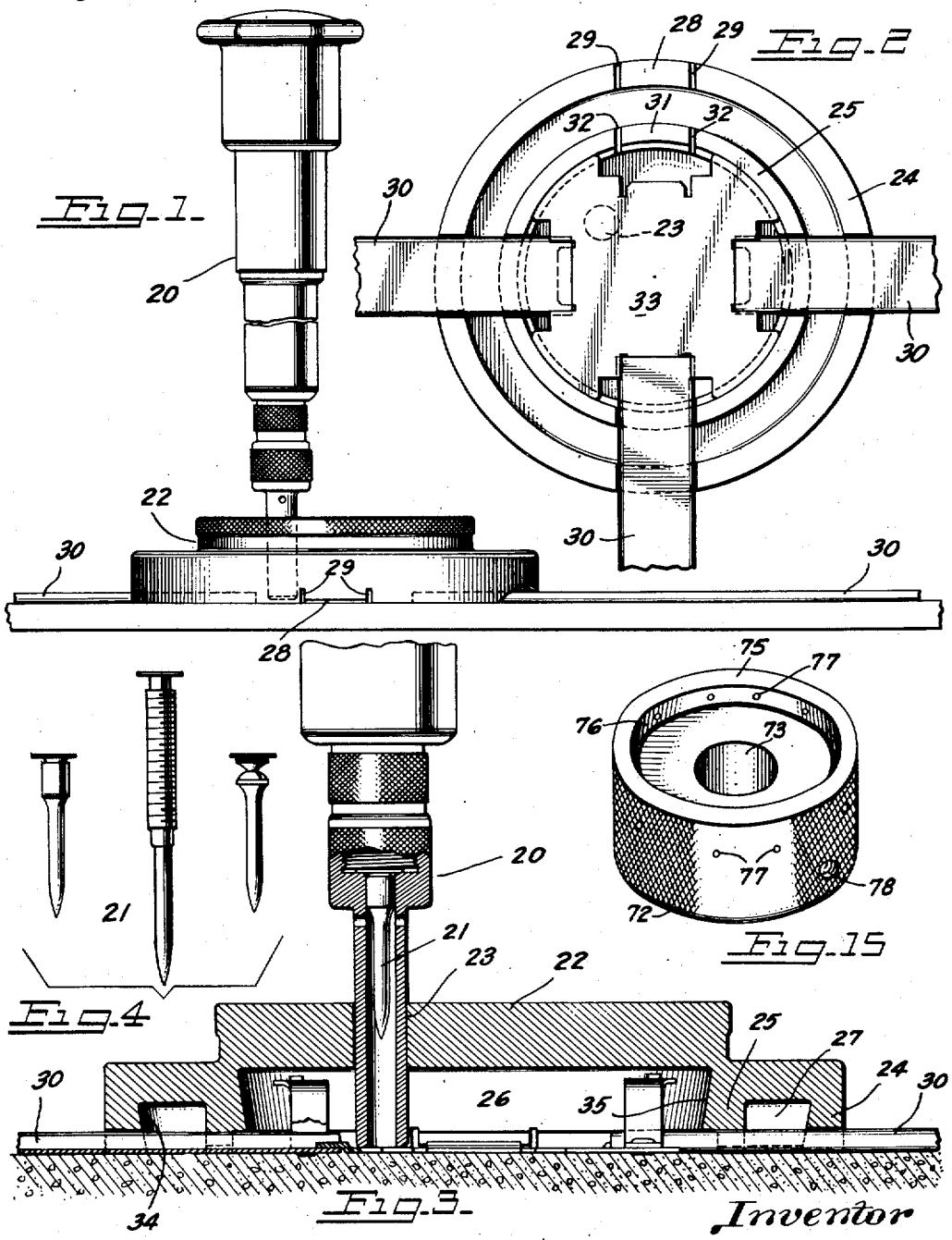
Inventor
Richard K. Baisch
By H. L. Godfrey
Attorney Feb. 23, 1954 R. K. BAISCH Re. 23,786

ARMOR SHIELD FOR PROJECTILE TYPE FASTENINGS

Original Filed Oct. 23, 1951 3 Sheets-Sheet 2

Inventor
Richard K. Baisch
By H. L. Godfrey
Attorney

ARMOR SHIELD FOR PROJECTILE TYPE FASTENINGS

Original Filed Oct. 23, 1951 3 Sheets-Sheet 3

Inventor
Richard K. Baisch
By H. L. Godfrey
Attorney

Reissued Feb. 23, 1954 Re. 23,786

UNITED STATES PATENT OFFICE 23,786

ARMOR SHIELD FOR PROJECTILE TYPE FASTENINGS

Richard K. Baisch, Cottage City, Md., assignor to Remington Arms Company, Inc., Bridgeport, Conn., a corporation of Delaware Original No. 2,594,275, dated April 29, 1952, Serial No. 252,788, October 23, 1951. Application for reissue March 18, 1953, Serial No. 343,274

4 Claims. (Cl. 1—44.5)

(Granted under Title 35, U. S. Code (1952), sec. 266)

Matter enclosed in heavy brackets [ ] appears in the original patent but forms no part of this reissue specification; matter printed in italics indicates the additions made by reissue.

The invention described herein may be manufactured and used by or for the Government of the United States for governmental purposes without the payment to me of any royalty thereon in accordance with the provisions of the Act of April 30, 1928, (Ch. 460, 45 Stat. L. 467).

The usual method of securing fastenings for wire-mold pipes and the like to concrete or brick walls, floors, and ceilings of buildings has been to use a hammer drill or a pneumatically operated drill to make holes for expandible anchors which grip the sides of a hole. This is an expensive and tedious job and tests have demonstrated that studs of one quarter of an inch in diameter would fail by pulling out of the holes at about 900 pounds per square inch.

Recently developed tools use the explosive force of powder to drive tapered studs into concrete and even steel. These have shown that studs applied by explosive force required a force of 3800 pounds per square inch to pull them out of a supporting structure such as a concrete floor. The time saved by using these very powerful and efficient tools can result in a great saving in time and a corresponding reduction in labor cost, but for the fact that the use of these tools introduces a very serious hazard to the lives and limbs of the workmen handling the tools as well as others who may be within the range of drive pins which escape laterally from beneath the tools or from flying fragments of stone, concrete, metal-scale, etc.

My invention provides a safe-guard against accidental injury to mechanics while they operate such explosively operated tools which project tapered drive pins into supporting structures for fastening thereto wire-mold, pipes or the like. It comprises an armor shield provided with a guiding aperture for the muzzles of such tools and a retaining flange which is tapered inwardly toward the center of the shield for stopping and retaining within the armor shield ricocheted projectiles, fragments of concrete, stone, metal-scale, etc., which may escape laterally from beneath the nozzles of such tools at sufficient velocity to maim, or even kill, persons within the range of the projectiles.

In the accompanying drawings, which illustrate several embodiments of my invention:

Fig. 1 is an elevation of one modification which illustrates the use of my invention for attaching a wire-mold junction box.

Fig. 2 is a bottom plan view of my armor shield, a junction box base, and portions of the bases of three radiating wire-molds.

Fig. 3 is an enlarged section of my armor shield in a plane parallel to the picture plane of Fig. 1, showing a junction box base, a portion of an explosively operated attaching tool, and a drive pin in position for projection from the tool through a metal junction box base into a supporting concrete floor.

Fig. 4 illustrates three of numerous modifications of drive pins which may be projected from the tool.

Fig. 15 is a perspective bottom view of a fifth modification.

Figure 5:
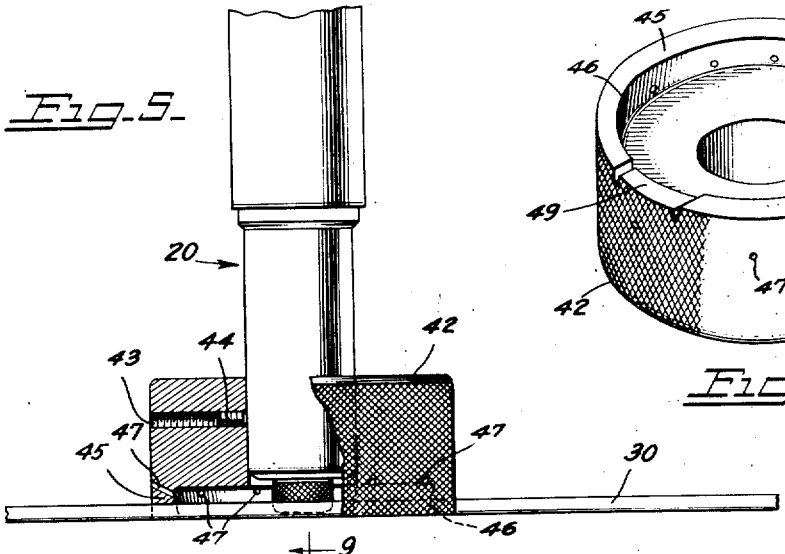
Fig. 5 is an elevation, partly in section, of a modification of my shield designed to be clamped over the muzzle of a tool for attaching lengths of the base of wire-mold.

In the modification illustrated in Figs. 1 to 3, inclusive, 20 indicates one of several tools now on the market which eject projectile-type fastenings 21 by explosive force. It is shown in operative combination with my armor shield 22 provided with a tool receiving aperture 23. My shield 22 is provided with concentric annular flanges 24 and 25 which enclose chambers 26 and 27. The flange 24 is provided with a plurality of wide shallow slots 28, each of which merges into deeper terminal slots 29 to form U-shaped slots to receive a U-shaped base section 30, of a common form of wire-mold. The inner flange 25 is similarly slotted with a shallow slot 31 and terminal deeper slots 32 which align with those in the flange 24. The flange 25 also provides a centering means for properly aligning the tool 20 with the junction box base 33.

My shield 22 and the flanges 24 and 25 are made of metal of sufficient toughness and thickness to prevent accidental penetration by laterally deflected fastenings and the faces 34 and 35 of these flanges are tapered inwardly to insure the retention within the chambers of my shield of all flying fragments and drive pins 21, thereby protecting the operator of the tool and others within a possible range of drive pins which may ricochet, instead of embedding themselves as intended in a supporting structure.

Figure 6:
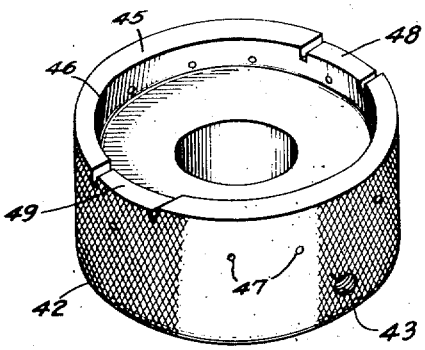
Fig. 6 is an enlarged perspective bottom view of the modification illustrated in Fig. 5.
Figure 7:
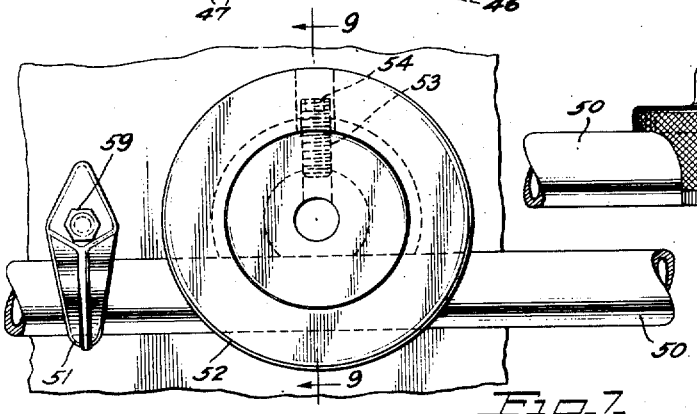
Fig. 7 is a plan view of a third modification of my shield designed for anchoring pipes to supporting structures by means of brackets.
Figure 8:
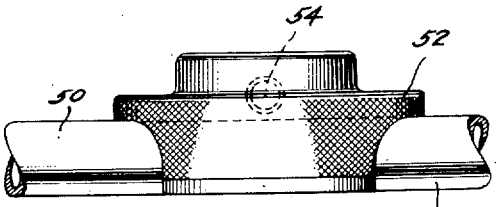
Fig. 8 is an elevation of this third modification.
Figure 9:
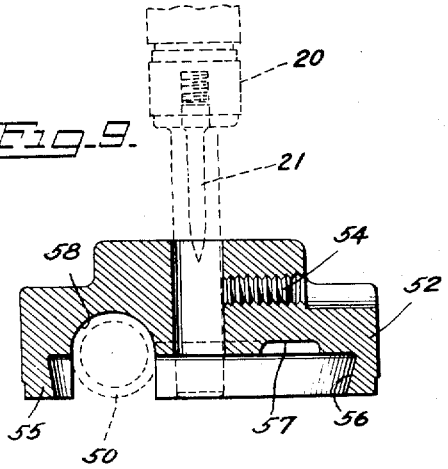
Fig. 9 is a section on the line 9—9 of Fig. 8.
Figure 10:
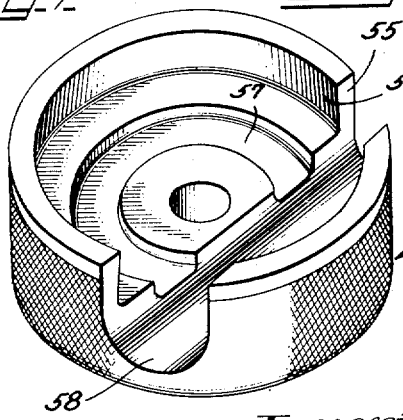
Fig. 10 is an enlarged perspective view of the form shown in Figs. 7, 8 and 9.
Figure 11:
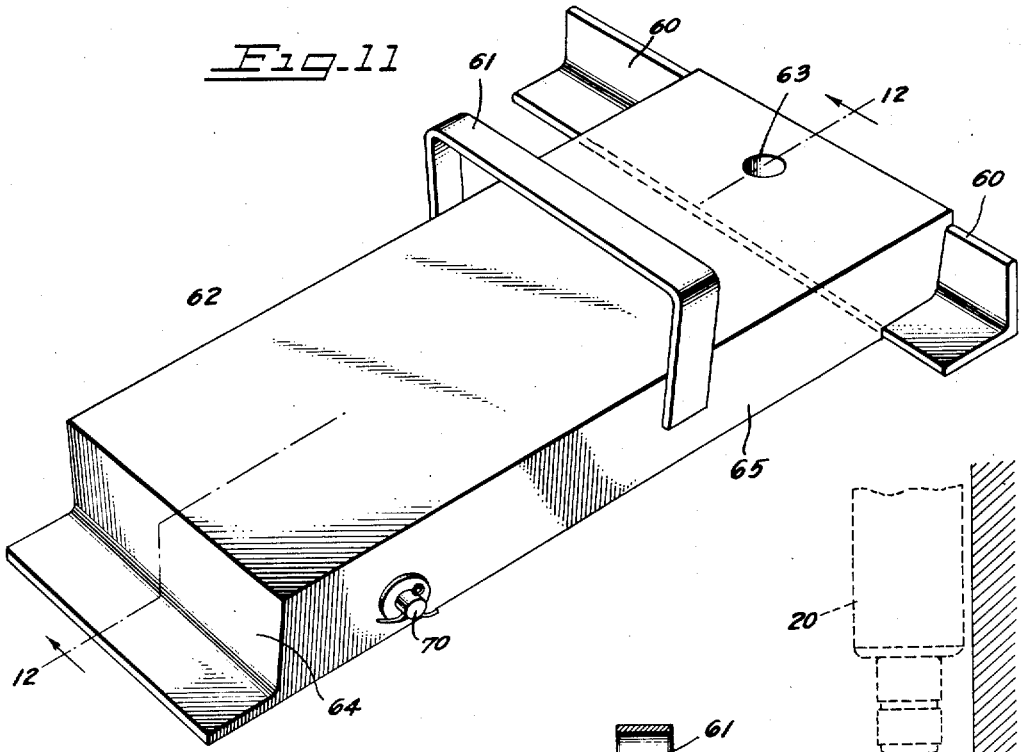
Fig. 11 is a perspective view of a fourth modification which is designed primarily for attaching anchoring angle-irons to floors.

The modified armor shield 42 which is illustrated in Figs. 5 and 6 is designed especially for use in attaching continuous strips of wire mold base to floors, walls and ceilings. It has a threaded aperture 43 for a set screw 44 for attaching the shield 42 to a tool 20. The shield is provided with an annular flange 45 having a face 46 which is tapered inwardly toward the shield opening which is closed when in use by the structure against which the shield is pressed and is also provided with a plurality of air escape vents 47. The flange 45 is provided with U-shaped slots 48 and 49 for receiving a U-shaped wire mold base 30.

A pipe 50 for water or electric wiring clamped on walls or ceilings by a bracket 51, may be attached by using a modified armor shield 52 illustrated in Figs. 7 to 10, inclusive. This shield is also provided with a radial threaded hole 53 for a set screw 54 by means of which it may be detachably secured to a tool 20. It is provided with an annular flange 55 having a tapered face 56, a weight-reducing annular recess 57, and a channel 58 for straddling a pipe. A drive pin with a threaded extension and a nut 59 will be used for bolting the bracket 51 over the supported pipe 50.

Figure 12:
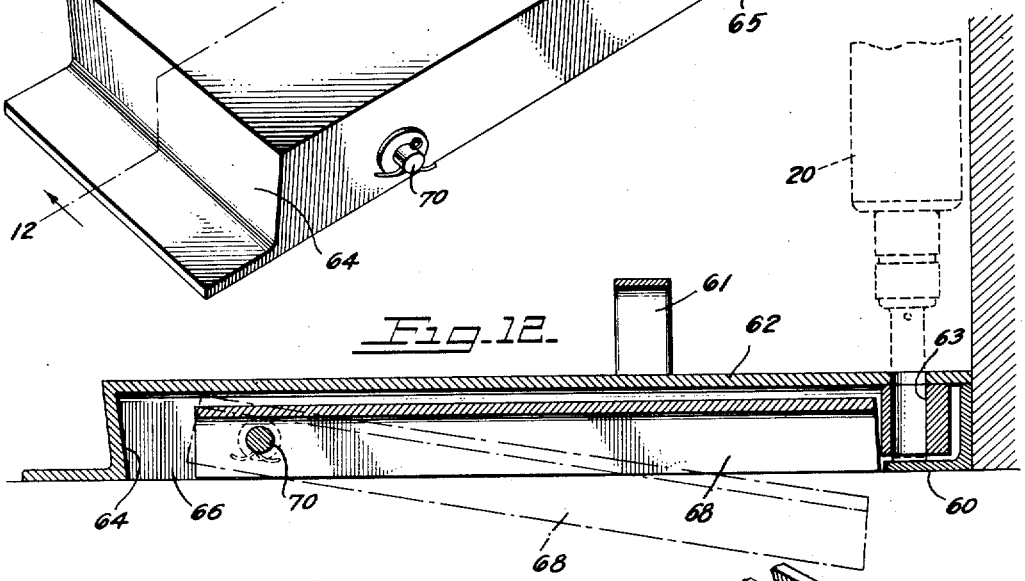
Fig. 12 is a section on the line 12—12 of Fig. 11.
Figure 13:
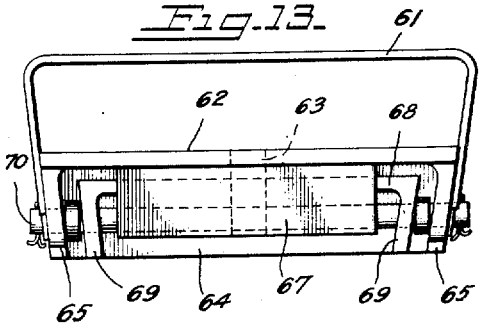
Fig. 13 is an elevation of my shield as seen from the right of Fig. 11, a section of angle-iron which is included in Fig. 11 being omitted.
Figure 14:
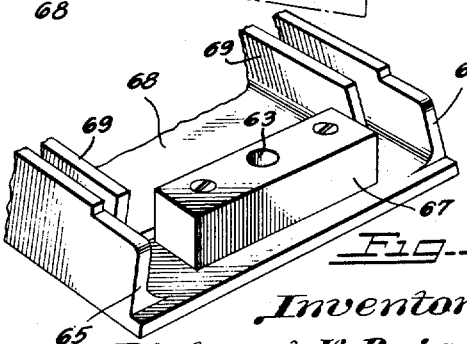
Fig. 14 is an enlarged bottom perspective of the open right hand end of this armor shield.

A further modification of my shield is illustrated in Figs. 11 to 14, inclusive, which is designed for attaching an anchoring angle-iron 60 to a floor. A handle 61 is provided for quickly shifting this armor shield 62 which is also provided with a tool-receiving aperture 63. The end flange 64 and side flanges 65 are tapered as indicated in Figs. 12 and 13, and form three sides of a missile-confining chamber 66, the remaining side of which is provided by the angle-iron 60. As additional protection against the escape of misdirected fastenings, there are provided an apertured tool-muzzle-confining block 67 rigidly united with the armor shield 62. A channel 68 has inwardly inclined flanges 69 and is pivotally mounted near the closed end of the shield 62 on a shaft 70. In this modification, the channel 68 provides additional protection against injuries due to ricocheted projectiles whenever this shield is used on an uneven floor which might leave a crack between the sides 65 and the supporting floor. In Fig. 15, there is illustrated an armor shield 72 which lacks the U-shaped notches 48, 49 of the modification of the shield illustrated in Fig. 6. This modification is designed for use in attaching fastenings of the types illustrated in Temple, No. 2,549,993, Fig. 4, and Dunn, No. 2,504,311, Fig. 9.

It has a tool receiving aperture 73 for an attaching tool 20, not shown in this view.

The shield 72 is provided with a marginal flange 75 which, unlike the preceding modifications, has no notches.

The inner surface 76 of the flange 75 extends outwardly and upwardly from the outer margin of the flange to form a missile confining surface to prevent any scattering of pieces of metal or of the material into which the fastenings are inserted. This shield 72 is provided with a plurality of small pressure relieving vents 77, and a threaded aperture 78 for a set screw (not shown) for clamping the shield 72 to a tool 20. The vents 77 provide a sole means for relieving pressure within this shield.

Whenever the nature of a job permits the fastening of my shield to the tool as illustrated in Figs. 5 to 10, inclusive, and Fig. 15, one workman, instead of two, may use the tool on ceilings with less need for using goggles to protect his eyes from grains of sand or particles of dirt which may be loosened by the shock of the explosion of each pin projecting charge. In each of the modifications illustrated in Figs. 1 to 10, inclusive, the surfaces of the shield are knurled to prevent slipping while handling. *It will be noted that ordinarily the muzzle of the explosively operated tool is merely inserted loosely in the aperture in the armor shield so that the tool is permitted to recoil with respect to the shield. It will be further noted that the volume of the shield as compared with the volume of the barrel of the tool is substantial, thus providing a chamber for the expansion of the powder gas.*

While I have shown and described a preferred embodiment of my invention, changes may be made in the construction and arrangement without departing from the spirit and scope of the invention as disclosed herein.

What I claim is:

1. An armor shield provided with an aperture through its upper surface for receiving the muzzle of a tool adapted to insert explosive propelled fastenings, an integral marginal flange thereon forming a missile confining chamber with a surface against which said flange is held, the inner surface of said flange extending from its outer edge upwardly and outwardly to form a confining surface to arrest any flying pieces of material scattered by explosive force, said armor shield being provided with pressure relieving vents.

2. An armor shield provided with an aperture on its upper surface for receiving the muzzle of a tool adapted to insert explosive propelled fastenings, an integral marginal flange thereon forming a missile confining chamber with a surface against which said flange is held, said flange being notched for straddling an article to be fastened to a supporting structure, and the inner surface of said flange from its outer edge extending outwardly and upwardly to form a confining surface to prevent any scattering of pieces of metal or of the material into which the fastenings are inserted, said shield being provided with a plurality of gas pressure relieving vents.

3. An armor shield provided with an aperture on its upper surface for receiving the muzzle of a tool adapted to insert explosive propelled fastenings, an integral marginal flange thereon forming a missile confining chamber with a surface against which said flange is held, said flange being notched for straddling an article to be fastened to a supporting structure and to provide a gas pressure relieving vent, and the inner surface of said flange from its outer edge extending outwardly and upwardly to form a confining surface to prevent any scattering of pieces of metal or of the material into which the fastenings are inserted.

*4. An armor shield for a tool comprising a barrel having an exterior surface and adapted to explosively propel a fastening device, said shield comprising an upper member having therein an aperture adapted to receive the muzzle of such barrel and being bounded by a surface slidably engaging on the exterior surface of said barrel to enable at least limited recoil movement of said barrel relative to said shield, said shield further comprising an integral marginal flange extending from said upper member and adapted when held against a substantially flat surface to*

*form with such surface and said upper member a gas expansion and missile confining chamber.*

RICHARD K. BAISCH.

References Cited in the file of this patent or the original patent

UNITED STATES PATENTS

| Number | Name | Date |
|---|---|---|
| 2,549,993 | Temple | Apr. 24, 1951 |
| 2,558,230 | Barron | June 26, 1951 |